United States Patent
Saidi et al.

(10) Patent No.: US 11,429,532 B2
(45) Date of Patent: Aug. 30, 2022

(54) WRITE OPERATIONS TO NON-VOLATILE MEMORY

(71) Applicant: ARM Limited, Cambridge (GB)

(72) Inventors: Ali Ghassan Saidi, Austin, TX (US); Richard Roy Grisenthwaite, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/501,278

(22) PCT Filed: Jun. 23, 2015

(86) PCT No.: PCT/GB2015/051823
§ 371 (c)(1),
(2) Date: Feb. 2, 2017

(87) PCT Pub. No.: WO2016/020637
PCT Pub. Date: Feb. 11, 2016

(65) Prior Publication Data
US 2017/0220478 A1 Aug. 3, 2017

(30) Foreign Application Priority Data
Aug. 4, 2014 (GB) ..................................... 1413772

(51) Int. Cl.
*G06F 12/08* (2016.01)
*G06F 12/10* (2016.01)
(Continued)

(52) U.S. Cl.
CPC ...... *G06F 12/0891* (2013.01); *G06F 12/0804* (2013.01); *G06F 12/0815* (2013.01);
(Continued)

(58) Field of Classification Search
CPC ............. G06F 12/0891; G06F 12/0815; G06F 12/0875; G06F 12/1009; G06F 2212/202; G06F 2212/621; G06F 2212/65
See application file for complete search history.

(56) References Cited

U.S. PATENT DOCUMENTS 5,404,482 A 4/1995 Stamm et al.
5,802,582 A 9/1998 Ekanadham et al.
(Continued)

FOREIGN PATENT DOCUMENTS

CN 101650972 2/2010
CN 103946811 7/2014
(Continued)

OTHER PUBLICATIONS

International Search Report for PCT/GB2015/051823 dated Sep. 17, 2015, 4 pages.
(Continued)

*Primary Examiner* — Masud K Khan
(74) *Attorney, Agent, or Firm* — Nixon & Vanderhye P.C.

(57) ABSTRACT

An apparatus for processing data and a method of data processing are provided. A processor core in the apparatus performs data processing operations in response to a sequence of instructions, including write operations which write data items to a non-volatile memory. A write-back cache stores local copies of the data items retrieved from the memory and written to the memory by the processor core. A storage unit is provided which stores indications of the write operations initiated by the processor core and the processor core is configured to respond to an end instruction by causing the local copies of data items which are the subject of the write operations by the processor core, and for which an indication is stored in the storage unit, to be cleaned from
(Continued)

the write-back cache to the memory. The indications of the write operations stored in the storage unit are then cleared.

20 Claims, 7 Drawing Sheets

(51) Int. Cl.

| | | |
|---|---|---|
| *G06F 12/12* | (2016.01) | |
| *G06F 12/0891* | (2016.01) | |
| *G06F 12/0815* | (2016.01) | |
| *G06F 12/0804* | (2016.01) | |
| *G06F 12/0875* | (2016.01) | |
| *G06F 12/1009* | (2016.01) | |
| *G06F 12/126* | (2016.01) | |
| *G06F 9/30* | (2018.01) | |
| *G06F 9/46* | (2006.01) | |

(52) U.S. Cl.
CPC ...... *G06F 12/0875* (2013.01); *G06F 12/1009* (2013.01); *G06F 9/30* (2013.01); *G06F 9/46* (2013.01); *G06F 12/126* (2013.01); *G06F 2212/202* (2013.01); *G06F 2212/621* (2013.01); *G06F 2212/65* (2013.01)

(56) References Cited

U.S. PATENT DOCUMENTS

| | | | |
|---|---|---|---|
| 7,360,031 B2 | 4/2008 | Lakshmanamurthy et al. | |
| 7,877,549 B1 | 1/2011 | Panwar et al. | |
| 2003/0079094 A1* | 4/2003 | Rajwar | G06F 9/3004 |
| | | | 711/150 |
| 2004/0187123 A1 | 9/2004 | Tremblay et al. | |
| 2007/0156994 A1 | 7/2007 | Akkary et al. | |
| 2010/0023704 A1 | 1/2010 | Christie et al. | |
| 2012/0079211 A1 | 3/2012 | Laycock et al. | |
| 2012/0198205 A1* | 8/2012 | Eilert | G06F 11/302 |
| | | | 711/206 |
| 2013/0091331 A1 | 4/2013 | Moraru et al. | |
| 2013/0227201 A1* | 8/2013 | Talagala | G06F 12/0246 |
| | | | 711/103 |
| 2013/0262775 A1 | 10/2013 | Asaro | |
| 2014/0019689 A1* | 1/2014 | Cain, III | G06F 12/0862 |
| | | | 711/136 |
| 2015/0074336 A1* | 3/2015 | Nemoto | G06F 3/0679 |
| | | | 711/103 |
| 2017/0192886 A1* | 7/2017 | Boehm | G06F 12/0804 |
| 2017/0220478 A1 | 8/2017 | Saidi et al. | |
| 2018/0060233 A1 | 3/2018 | Parmer | |

FOREIGN PATENT DOCUMENTS

| | | |
|---|---|---|
| EP | 3 531 292 | 8/2019 |
| GB | 2515146 | 12/2014 |
| JP | H07-271669 | 10/1995 |
| JP | H10-275112 | 10/1998 |
| JP | 2006-91995 | 4/2006 |

OTHER PUBLICATIONS

Written Opinion for PCT/GB2015/051823 dated Sep. 17, 2015, 5 pages.
Search Report for GB 1413772.3 dated Feb. 5, 2015, 3 pages.
Condit et al., "Better I/O Through Byte-Addressable, Persistent Memory", *SOSP '09*, Oct. 11-14, 2009, 14 pages.
Moraru et al., "Consistent, Durable, and Safe Memory Management for Byte-addressable Non Volatile Main Memory", *TRIOS'13*, Nov. 3, 2013, 17 pages.
Pelley et al., "Memory Persistency", *ACM SIGARCH Computer Architecture News*, 42(3), Jun. 2014, 12 pages.
U.S. Appl. No. 15/831,609, filed Dec. 5, 2017, Rose et al.
Office Action dated Apr. 18, 2019 in EP Application No. 15732907.9, 6 pages.
International Search Report and Written Opinion of the International Searching Authority dated Feb. 25, 2019 in PCT/GB2018/053442, 18 pages.
Office Action dated Dec. 18, 2018 in IL Application No. 250300, 3 pages.
Office Action dated May 30, 2019 in co-pending U.S. Appl. No. 15/831,609, 24 pages.
Office Action for JP Application No. 2017-504748 dated Jun. 11, 2019 and English translation, 7 pages.
Examination Report for GB Application No. 1413772.3 dated Oct. 30, 2019, 5 pages.
First Office Action for CN Application No. 201580042098.X dated Oct. 31, 2019 and English translation, 30 pages.
Office Action for KR Application No. 10-2017-7004760 dated Aug. 31, 2021 and English translation, 12 pages.
Office Action for CN Application No. 201580042098.X dated Sep. 29, 2020 and English translation, 31 pages.
Second Office Action for CN Application No. 201580042098.X dated May 7, 2020 and English translation, 25 pages.
First Examination Report for IN Application No. 201717006899 dated Nov. 24, 2020, 8 pages.

* cited by examiner

NVBA_BEGIN:

NVBA CONTROLLER MUST:

A) ACKNOWLEDGE RECEIPT
OF CLEAN COMMAND;
OR
B) CONFIRM COMPLETION
OF CLEAN

NVBA_END:

UNTIL THIS NVBA_END IS COMPLETED:

STALL ALL SUBSEQUENT NVBA_BEGINs;

STALL ALL SUBSEQUENT WRITES TO NVBA;

STALL ALL SUBSEQUENT MEMORY OPERATIONS;
OR
STALL ALL SUBSEQUENT INSTRUCTIONS

WRITE OPERATIONS TO NON-VOLATILE MEMORY

This application is the U.S. national phase of International Application No. PCT/GB2015/051823 filed Jun. 23, 2015 which designated the U.S. and claims priority to GB Patent Application No. 1413772.3 filed Aug. 4, 2014, the entire contents of each of which are hereby incorporated by reference.

TECHNICAL FIELD

The present disclosure relates to a data processing apparatus. More particularly, the present disclosure relates to a data processing apparatus having a write-back cache.

BACKGROUND

It is known to provide a data processing apparatus with access to a non-volatile memory in which data items on which the data processing apparatus performs data processing operations are stored. Being a non-volatile memory, the content of this non-volatile memory will be persistent after power to the data processing system has been interrupted and restored, whether due to a controlled restart or due to an unexpected event.

It is also known to provide a data processing apparatus with a write-back cache associated with a processor of the data processing apparatus, in which local copies of data items retrieved from a memory and being written out to the memory are temporarily stored. As the cache has a write-back configuration, data items which are stored in the cache and which are modified are only written out to the memory when it is necessary to do so, for example because a cache line holding a data item is evicted from the cache.

The provision of both a write-back cache and access to a non-volatile memory can however present difficulties. Techniques are described herein to improve an apparatus comprising a write-back cache and non-volatile memory.

SUMMARY

In accordance with a first example configuration there is provided an apparatus for processing data comprising a processor core capable of performing data processing operations in response to a sequence of instructions, wherein the data processing operations comprise read operations which retrieve data items from a memory and write operations which write data items to the memory, wherein the memory is a non-volatile memory; a write-back cache capable of storing local copies of the data items retrieved from the memory and written to the memory by the processor core when executing the sequence of instructions; and a storage unit capable of storing indications of the write operations initiated by the processor core, and the processor core is capable of responding to an end instruction in the sequence of instructions by: causing the local copies of data items which are the subject of the write operations by the processor core and for which an indication is stored in the storage unit to be cleaned from the write-back cache to the memory; and clearing the indications of the write operations stored in the storage unit.

In accordance with a second example configuration there is provided a method of processing data comprising the steps of: performing data processing operations in response to a sequence of instructions, wherein the data processing operations comprise read operations which retrieve data items from a memory and write operations which write data items to the memory, wherein the memory is a non-volatile memory; storing local copies in a write-back cache of the data items retrieved from the memory and written to the memory when executing the sequence of instructions; storing indications of the write operations initiated in the performing data processing operation step; and responding to an end instruction in the sequence of instructions by: causing the local copies of data items which are the subject of the write operations and for which an indication has been stored in the storing local copies step to be cleaned from the write-back cache to the memory; and clearing the indications of the write operations stored in the storing indications step.

In accordance with a third example configuration there is provided an apparatus for processing data comprising: means for performing data processing operations in response to a sequence of instructions, wherein the data processing operations comprise read operations which retrieve data items from a memory and write operations which write data items to the memory, wherein the memory is a non-volatile memory; means for storing local copies of the data items retrieved from the memory and written to the memory when executing the sequence of instructions, wherein the means for storing has a write-back configuration with respect to the memory; means for storing indications of the write operations initiated by the means for performing data processing operations; and means for responding to an end instruction in the sequence of instructions which: causes the local copies of data items which are the subject of the write operations and for which an indication has been stored by the means for storing local copies to be cleaned from the write-back cache to the memory; and clears the indications of the write operations stored in the means for storing indications.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
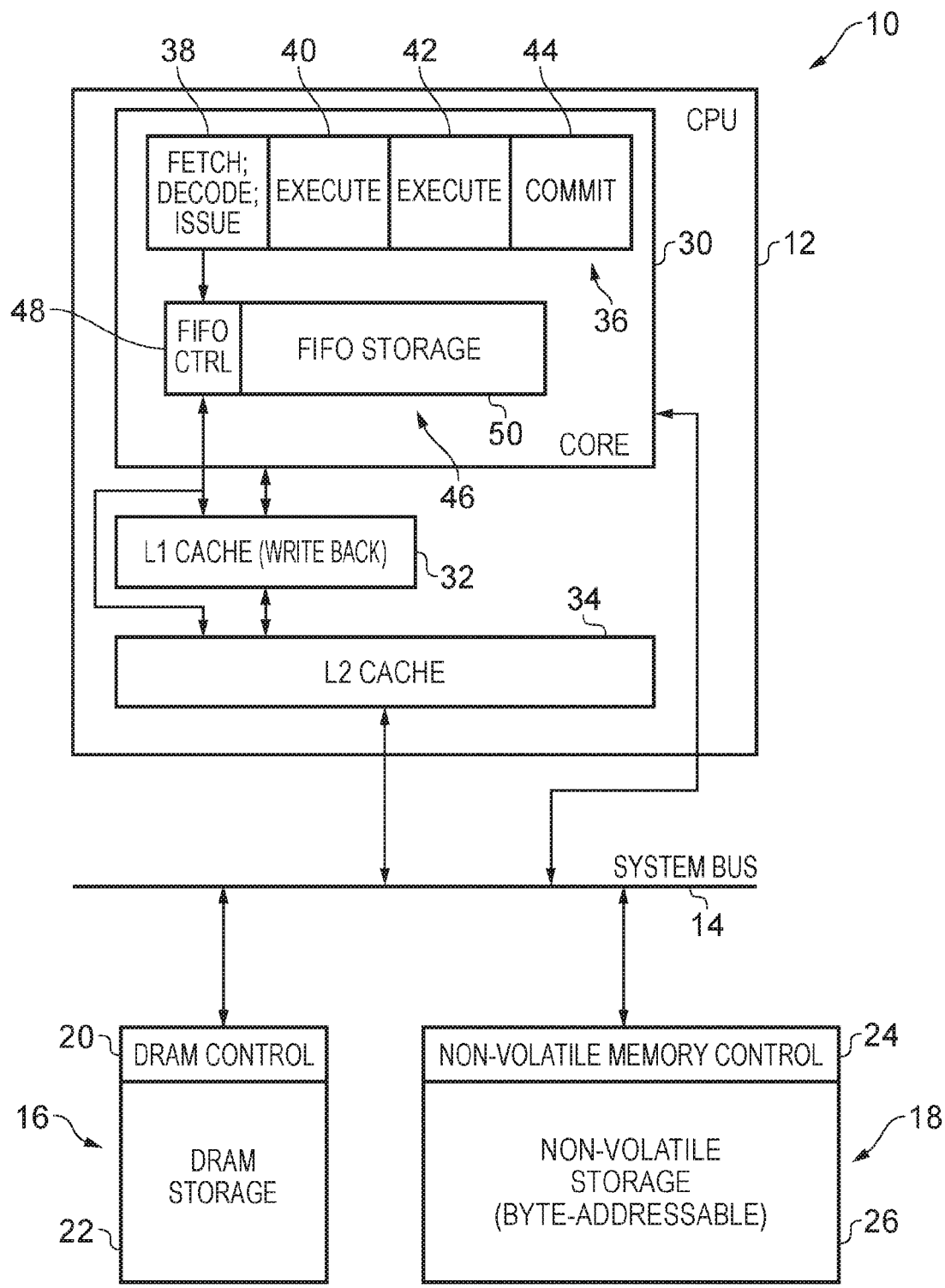
FIG. 1 schematically illustrates a data processing system including a data processing apparatus in one embodiment.

At least some embodiments provide an apparatus for processing data comprising a processor core capable of performing data processing operations in response to a sequence of instructions, wherein the data processing operations comprise read operations which retrieve data items from a memory and write operations which write data items to the memory, wherein the memory is a non-volatile memory; a write-back cache capable of storing local copies of the data items retrieved from the memory and written to the memory by the processor core when executing the sequence of instructions; and a storage unit capable of storing indications of the write operations initiated by the processor core, and the processor core is capable of responding to an end instruction in the sequence of instructions by: causing the local copies of data items which are the subject of the write operations by the processor core and for which an indication is stored in the storage unit to be cleaned from the write-back cache to the memory; and clearing the indications of the write operations stored in the storage unit.

The present techniques address the above-mentioned issues resulting from a processor core seeking to read data items from and write those (modified) data items to a non-volatile memory, wherein the writing of data items to the non-volatile memory is mediated via a write-back cache. In particular, the apparatus comprises a storage unit which is capable of storing indications of the write operations initiated by the processor core to the non-volatile memory. In association with the provision of this storage unit, an instruction is added to the range of instructions which the processor core is capable of responding to in the course of performing its data processing operations, and in response to this instruction (an "end instruction") the processor core causes those entries in the write-back cache for which a corresponding indication of a write operation initiated by the processor core is currently stored in the storage unit to be cleaned from the write-back cache to the non-volatile memory. The "cleaning" of a data item from the write-back cache to the non-volatile memory should be understood here to mean that the modified copy of that data item stored in the write-back cache is used to update the original data item stored in the non-volatile memory. The content of the storage unit is then also cleared. Thus, where the programmer of the data processing apparatus wishes to ensure that a particular ordering of write operations (initiated by the execution of write instructions) will take place with respect to the non-volatile memory, this can be done by the addition of the end instruction into the sequence of instructions given by the programmer to define the data processing operations which the apparatus should carry out.

In some embodiments, the non-volatile memory is byte-addressable. However other styles of addressability are also contemplated and as such the non-volatile memory could be word addressable, cache line addressable, and so on.

In some embodiments, the processor core is further capable of causing the indications of the write operations initiated by the processor core to be stored in a storage unit after a begin instruction in the sequence of instructions. Thus a further instruction may be added to the instruction set to which the processor core is responsive which enables the system programmer to encapsulate a "write set" of write operations (preceded by the begin instruction and concluded by the end instruction). It can then be ensured, in terms of the operation of the write-back cache and not by the operation of the processor core (which may, for scheduling reasons, vary the order in which particular instructions are executed) that the write order (of this write set with respect to other write operations) desired by the programmer will be respected in the content of the non-volatile memory.

In some embodiments the processor core is capable of only being able to perform a write operation to a predetermined portion of the memory if a pending write instruction specifying the predetermined portion of the memory is preceded by the begin instruction and followed by the end instruction. Similarly, in some embodiments the processor core is capable of preventing a write operation to a predetermined portion of the memory from being performed if a pending write instruction specifying the predetermined portion of the memory is not preceded by the begin instruction and followed by the end instruction. This enables a specific portion of the memory address space accessible to the processor core, which may for example be that portion provided by the non-volatile memory, to be protected in that it cannot be written to unless the write instruction seeking to write there is preceded by the begin instruction and followed by the end instruction. This protects this memory portion, e.g. the non-volatile memory, from "stray writes" (e.g. resulting from bugs in the program) corrupting it.

The processor core may be arranged in a number of ways to handle other instructions in the sequence of instructions which it executes when the presence of the end instruction (and possibly additionally a begin instruction) is identified. For example, in some embodiments, the processor core is capable of responding to the end instruction and a subsequent begin instruction in the sequence of instructions by causing the subsequent begin instruction in the sequence of instructions to stall until the end instruction has completed. The begin instruction is available to the programmer to define the start of a next write set, and hence where the processor core encounters a subsequent begin instruction after an end instruction, it can be ensured that this next write set is not handled until the previous write set has been dealt with, by causing the subsequent begin instruction to stall until the end instruction has completed (i.e. drained from the processor core pipeline).

In some embodiments the processor core is capable of responding to the end instruction and a subsequent memory operation instruction in the sequence of instructions by causing the subsequent memory operation instruction in the sequence of instructions to stall until the end instruction has completed. Hence one or more memory operations (which will be carried out in response to one or more memory operation instructions in the sequence of instructions) can be cause to stall when these follow the end instruction in the sequence of instructions, thus ensuring that the result of those memory operations cannot take effect in the non-volatile memory until the pre-defined end instruction has completed, providing a further level of protection to the write set which concludes with the end instruction.

Indeed, in some embodiments the processor core is capable of responding to an end instruction and a subsequent instruction in the sequence of instructions by causing the subsequent instruction in the sequence of instructions to stall until the end instruction has completed. Hence, a yet further level of protection for the write set which concludes with the end instruction is thus provided in that any subsequent instruction in the sequence of instructions can be caused to stall until the end instruction has completed.

The storage unit, in which the indications of the write operations to the non-volatile memory initiated by the processor core are stored, could take a number of forms, but in some embodiments the storage unit is a first-in-first-out (FIFO) storage unit. This FIFO structure could be provided in a number of different locations in the apparatus, as long as it is accessible to the processor core, but in some embodiments the processor core comprises the first-in-first-out storage unit. This facilitates the access to and maintenance of the FIFO structure by the processor core.

Alternatively, in some embodiments the storage unit is provided by the write-back cache and the indications of the write operations initiated by the processor core are stored as markers associated with cache lines stored in the write-back cache, wherein setting of a marker of the markers indicates if a local copy of a data item forming at least part of a cache line of the cache lines is the subject of the write operations by the processor core. Hence, a marker (e.g. a bit which can be set or cleared) can be stored in each cache line of the write-back cache when a data item is stored in that cache line, the setting of the marker indicating that at least one data item within that cache line is the subject of a write operation to the non-volatile memory by the processor core. This may facilitate the configuration of the write-back cache in a number of ways related to identifying such data items, in particular due to the direct availability (i.e. without reference to a separate structure within the apparatus) of the required information.

In some embodiments the storage unit is capable of storing at least partial memory addresses of the write operations initiated by the processor core as the indications. Full memory addresses might equally well be stored but would clearly require greater storage capacity and a partial memory address can suffice so long as this enables a corresponding entry in a cache line of the write-back cache to be identified.

In some embodiments the indications stored in the storage unit indicate at least one cache block where the data items corresponding to the write operations are stored in the write-back cache. This may in particular facilitate the coalescing of writes to the same cache block, in that it is not necessary to store an additional indication of a latter write operation to the storage unit if a former write operation has already been written to the storage unit relating to the same cache block in the cache, since cleaning to the non-volatile memory from the write-back cache typically takes place on a cache block basis and the indication stored for the former write operation will ensure that cleaning of the latter write operation will also take place.

In some embodiments the processor core is further capable of referencing a page table to determine virtual-to-physical memory address mappings, each entry in the page table comprises a flag to indicate if that entry corresponds to a predetermined memory address space, and the processor core is capable of causing indications of write operations to the predetermined memory address space initiated by the processor core to be stored in the storage unit. The processor core may have access to further memory devices than just the non-volatile memory, and additional information stored in the page table can then identify regions of the full accessible address space that are provided by the non-volatile memory and enable the processor core to cause the storage units only to be populated with information relating to write operations to the non-volatile memory.

Depending on the particular system requirements, different levels of confidence with respect to the cleaning of local copies of data items stored in the write-back cache to the non-volatile memory may be required. As such, in some embodiments the processor core is capable of responding to an encoding within the begin instruction to stall any instructions which follow the end instruction until a controller in the memory acknowledges receipt of a command to commit the local copies of the data items cleaned from the write-back cache to the memory. Thus, the write-set encapsulated by the begin instruction and the end instruction can be ensured to be already being handled by the memory controller of the non-volatile memory by virtue of the acknowledgement of a command to commit the cached data items to the memory.

However, for some applications it may be critical to know that the write-set has actually become persistent in the non-volatile memory and accordingly in some embodiments the processor core is capable of responding to an encoding within the begin instruction to stall any instructions which follow the end instruction until a controller in the memory indicates that the local copies of data items cleaned from the write-back cache to the memory have been committed to the memory. Hence, any instructions which follow the end instruction can be stalled until it is definitively known (by virtue of the indication from the non-volatile memory controller) that the corresponding data items cached in the write-back cache have actually been committed to the non-volatile memory.

In addition to the processor core's response to the end instruction, the cleaning of cached data items in the write-back cache relating to data items stored in the non-volatile memory may also take place at other times, and in some embodiments the apparatus is further capable of, in response to a clean condition causing at least one local copy of the local copies stored in the write-back cache which is the subject of at least one write operation by the processor core and for which an indication is stored in the storage unit to be cleaned from the write-back cache to the memory and clearing at least one corresponding indication of the at least one write operation stored in the storage unit. Hence, one or more clean conditions may be defined which will cause (at least partial) content of the write-back cache to be cleaned to the non-volatile memory from the write-back cache.

In some embodiments the clean condition is satisfied when the storage unit is full. Once the storage unit is full, no further indications may be stored therein and this is therefore an opportune situation in which to cause the cleaning to occur. In this situation it will be typical for any data items stored in the write-back cache which have a corresponding entry in the storage unit to be cleaned to the non-volatile memory, although a partial clean, according to which only a portion of the storage unit capacity is freed up is also conceived.

In some embodiments the clean condition is satisfied when a local copy stored in the write-back cache is evicted to the memory. Of course, the eviction of that local copy to the memory will in itself cause the cleaning of that local copy, but according to the present techniques either only a corresponding entry in the storage unit might be cleared corresponding to that evicted local copy, or a full clean, in which all data items stored in the write-back cache are cleaned to a non-volatile memory and all content of the storage unit is cleared is also envisaged.

In some embodiments the clean condition is satisfied when a local copy stored in the write-back cache is snooped by a cache coherence mechanism and for which an indication is stored in the storage unit. Such snooping by a cache coherence mechanism (i.e. initiated by another cache in the data processing system to which the apparatus belongs) could be handled in a number of ways, but cleaning the local copy stored in the write back cache enables a relatively simple response to the snoop to be made, indicating that the data item is now up-to-date.

In some embodiments the write-back cache is capable of storing clean-on-snoop markers associated with cache lines stored in the write-back cache, wherein setting of a clean-on-snoop marker indicates that a corresponding indication is stored in the storage unit. These clean-on-snoop markers, indicating that a corresponding indication is stored, i.e. this cache line contains at least one data item which will ultimately need to be cleaned to the non-volatile memory, and that this entry should be cleaned if snooped, enable the write-back cache to directly respond to the snoop made by the cache coherence mechanism without additionally referencing the storage unit to determine if a corresponding indication is stored there. Depending on the nature and configuration of the storage unit this could otherwise for example either require the storage unit to be content addressable or could require a iterative search through the storage unit.

However, in some embodiments the storage unit is a content addressable storage unit, which can facilitate the determination of whether a particular indication (i.e. relating to a particular data item stored in the write-back cache) is currently stored in the storage unit.

At least some embodiments provide a method of processing data comprising the steps of: performing data processing operations in response to a sequence of instructions, wherein the data processing operations comprise read operations which retrieve data items from a memory and write operations which write data items to the memory, wherein the memory is a non-volatile memory; storing local copies in a write-back cache of the data items retrieved from the memory and written to the memory when executing the sequence of instructions; storing indications of the write operations initiated in the performing data processing operation step; and responding to an end instruction in the sequence of instructions by: causing the local copies of data items which are the subject of the write operations and for which an indication has been stored in the storing local copies step to be cleaned from the write-back cache to the memory; and clearing the indications of the write operations stored in the storing indications step.

At least some embodiments provide an apparatus for processing data comprising: means for performing data processing operations in response to a sequence of instructions, wherein the data processing operations comprise read operations which retrieve data items from a memory and write operations which write data items to the memory, wherein the memory is a non-volatile memory; means for storing local copies of the data items retrieved from the memory and written to the memory when executing the sequence of instructions, wherein the means for storing has a write-back configuration with respect to the memory; means for storing indications of the write operations initiated by the means for performing data processing operations; and means for responding to an end instruction in the sequence of instructions which: causes the local copies of data items which are the subject of the write operations and for which an indication has been stored by the means for storing local copies to be cleaned from the write-back cache to the memory; and clears the indications of the write operations stored in the means for storing indications.

FIG. 1 schematically illustrates a data processing system 10 which comprises a CPU 12 coupled via a system bus 14 to a DRAM memory 16 and a non-volatile byte-addressable memory 18. The DRAM memory comprises a DRAM controller 20 and DRAM storage 22. Similarly, the non-volatile memory 18 comprises a non-volatile memory controller 24 and non-volatile storage 26.

The CPU 12, which in this example embodiment forms part of a system-on-chip device, comprises a processor core 30 and two levels of cache, namely a level one (L1) cache 32 and a level two (L2) cache 34. The core 30 itself comprises an execution pipeline 36 of which only four stages are shown here purely for simplicity and clarity of illustration, namely a fetch/decode/issue stage 38, two execution stages 40, 42 and a commit stage 44. Also provided within the core 30 is a FIFO storage unit 46 which comprises a FIFO controller 48 and the FIFO storage itself 50. The fetch/decode/issue stage 38 of the core pipeline 36 is configured to identify instructions in a sequence of instructions which the core 30 retrieves from memory (e.g. either the DRAM 16 or the non-volatile memory 18), and in particular with reference to the present techniques those write instructions which seek to write data items to the non-volatile byte-addressable (NVBA) memory 18. For these writes, the fetch/decode/issue stage 38 signals to the control unit 38 of the FIFO 46 that an entry should be stored in the FIFO storage 50 indicative of the write operation which this write instruction is seeking to perform. In this embodiment this corresponds to a portion of the memory address specified by that write instruction, this portion being sufficient to uniquely identify a corresponding entry made in a cache line of the L1 cache 32. The L1 cache 32 is configured to have a write-back configuration according to which a modified data item stored by the L1 cache 32 is not immediately updated in the memory from which that data item was originally retrieved, but may be held in the L1 cache 32 for an interim period until, for example, the cache line holding that data item is evicted, or an explicit command is received by the L1 cache to "clean" this data item, or the L1 cache's response to a snoop as part of a cache coherency mechanism is received to which the L1 cache 32 responds by cleaning this data item.

The FIFO storage unit 46 is provided within the core 30 to enable the data processing system 10 to maintain reliable content in the non-volatile memory 18, in particular in the face of the potential for a power failure or a system crash. Because the non-volatile memory 18 is persistent (unlike the DRAM 16), it is provided here that the processor core 30 has a mechanism for its software to know that all of a certain set of writes directed to the non-volatile memory 18 have been committed, before another set of writes begins, in order to be sure that the data stored in the non-volatile memory 18 is in a consistent state. For example, if the sequence of program instructions (software) being executed by the processor core 30 involves adding to a linked list, it is necessary for a new element of the linked list to be written back to the non-volatile memory 18 before the pointer to that block is updated and written back to the non-volatile memory 18. Note that with respect to a volatile memory such as the DRAM 16 a barrier executed by the processor core 30 can ensure such reliability, since the content of the DRAM is not persistent, but in the context of a non-volatile memory 18 a barrier is insufficient, because this only ensures a certain ordering of instruction/execution by the core pipeline 36. By contrast the operation of the L1 cache 32 and L2 cache 34 are transparent to the core 30 and therefore when dealing with non-volatile memory and at least one write-back cache (such as the L1 cache 32 in this example) the barrier cannot guarantee that a consistent state of the content of the non-volatile memory 18 will always be maintained, such that power failures or crashes in the data processing system 10 will not result in inconsistent data being stored there.

Figure 2:
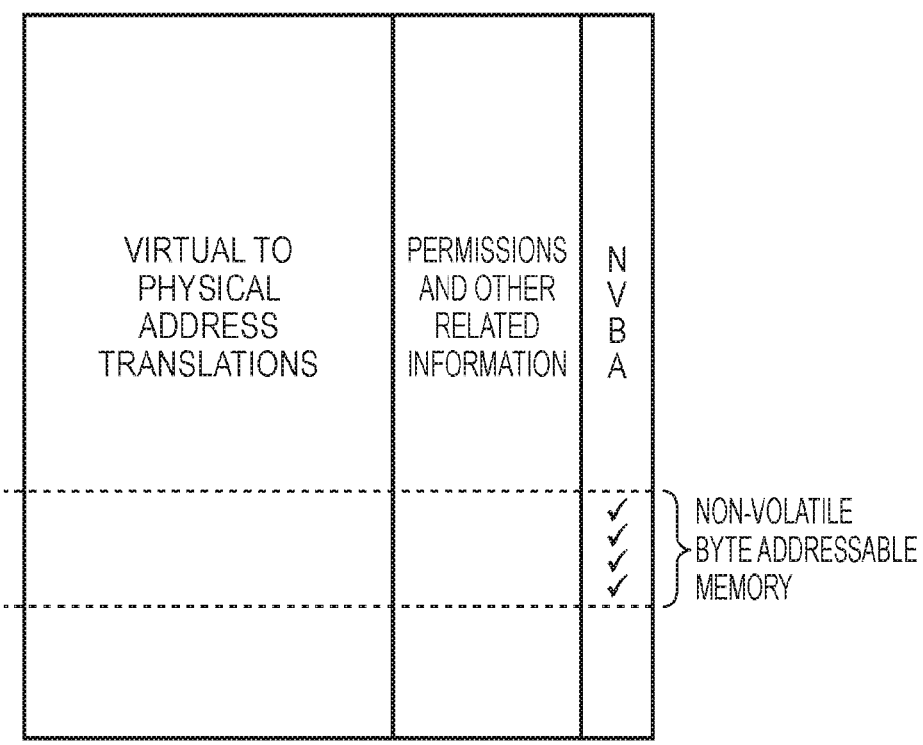
FIG. 2 schematically illustrates a page table which the data processing apparatus uses to determine virtual to physical address translations in one embodiment.

FIG. 2 shows a page table used by the processor core 30 to translate virtual memory addresses (used internally to the processor core 30) into physical memory addresses (used in the DRAM 16 and non-volatile memory 18). An additional marker (labelled NVBA in the figure—a set/non-set bit) in the page table indicates those memory addresses which correspond to the non-volatile memory 18. This labelling of the address translations which correspond to non-volatile memory enables the processor core 30 to identify when a write instruction which it encounters in the sequence of instructions will cause a write operation to the non-volatile memory to be carried out. In general, the processor core 30 can then be configured to populate an entry in the FIFO 46 corresponding to this write operation, although in the particular embodiments described here the architecture of the processor core 30 is such that in order for a write operation to be allowed to be carried out to a region of the memory marked as non-volatile, the corresponding write instruction may also be preceded by a nvba_begin instruction (which is used to identify the beginning of a write set relating to the non-volatile memory) and followed by a nvba_end instruction (used to identify the end of the write set relating to the non-volatile memory). In the event that a write instruction is encountered relating to any region of memory which is marked as NVBA, but that write instruction is not preceded by a nvba_begin instruction and followed by a nvba_end instruction, the processor core 30 is configured to prevent the write operation specified by that write instruction from being carried out. This arrangement protects the non-volatile memory from stray writes (i.e. bugs in the sequence of instructions which the processor core 30 executes) which could otherwise corrupt it.

Figure 3:
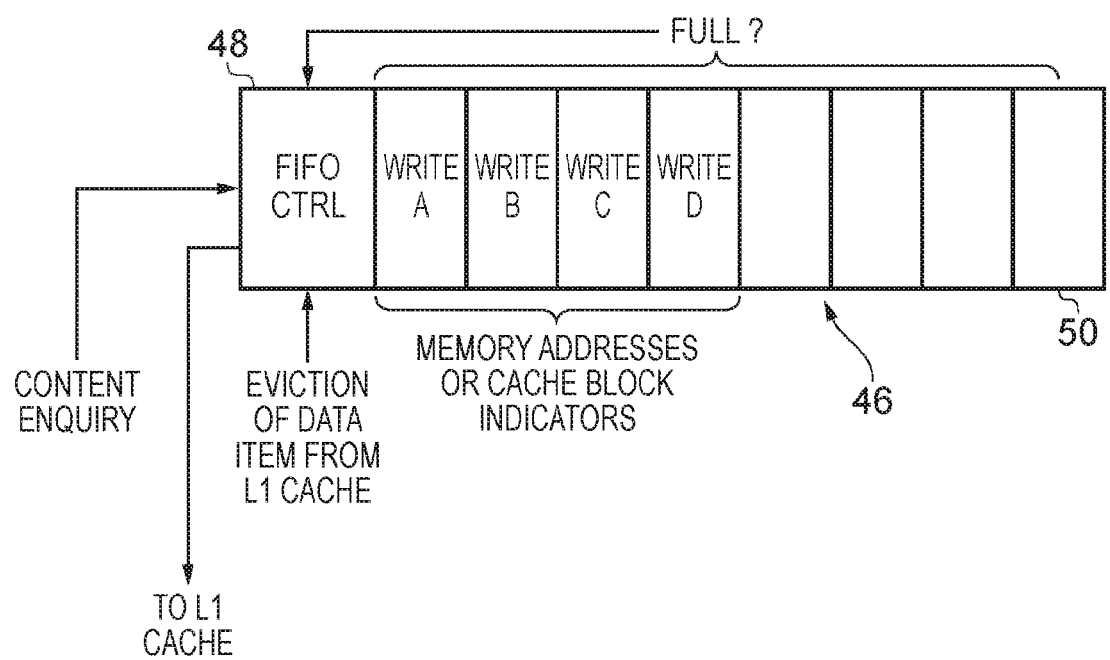
FIG. 3 schematically illustrates a FIFO storage unit provided in the processor core of one embodiment.

However, when a write instruction is encountered which relates to the non-volatile memory and is sandwiched by a nvba_begin instruction and a nvba_end instruction, the processor core 30 indicates to the FIFO control 48 and the L1 cache 32 that an indication of the write operation to be performed in response to this write instruction should be added into the FIFO storage 50. The FIFO 46 is shown in FIG. 3, in an example configuration in which four entries of the FIFO storage 50 are currently populated with indications of write operations A-D. As indicated in the figure these indications can comprise target memory addresses of the write operations (or indeed only partial memory addresses, where such is sufficient to identify a corresponding entry in the L1 cache 32) or may instead be cache block indicators, showing where the corresponding entry is to be found in the L1 cache 32. The FIFO control unit 48 maintains overall control of the FIFO 46, administering the addition of entries and the deletion of entries (either individually or the entire content of the FIFO) as required. Where the FIFO 46 is required to respond to an enquiry from the L1 cache as to whether a particular data item in the L1 cache has a corresponding entry in the FIFO storage 50, the FIFO storage 50 can be configured in a content addressable fashion in order to provide this functionality. One example of when such an individual enquiry may be received is on the eviction of a data item from the L1 cache, in response to which FIFO control 48 can be configured to cause a corresponding entry in the FIFO storage 50 to be removed. Alternatively, a content enquiry from the L1 cache may be received in response to a snoop enquiry received by the L1 cache as part of its participation in a cache coherency mechanism, although as will be described below with reference to FIG. 4, the L1 cache itself may be configured to store an indication of whether a corresponding entry is currently held in the FIFO 46 in order to avoid the necessity for the FIFO 46 to be provided with this content addressable memory configuration and thus facilitate the provision of the FIFO 46 as a relatively small addition to the core 30. Finally, as shown in FIG. 3 the FIFO control 48 is further configured to monitor if the FIFO storage 50 becomes fully populated (and therefore further entries will not be able to be made). In the event that the FIFO storage 50 is fully populated, FIFO control 48 signals this fact to the L1 cache 32, causing the corresponding entries in the L1 cache to then promptly be written back to the non-volatile memory 18, and the content of the FIFO 46 is cleared.

Figure 4:
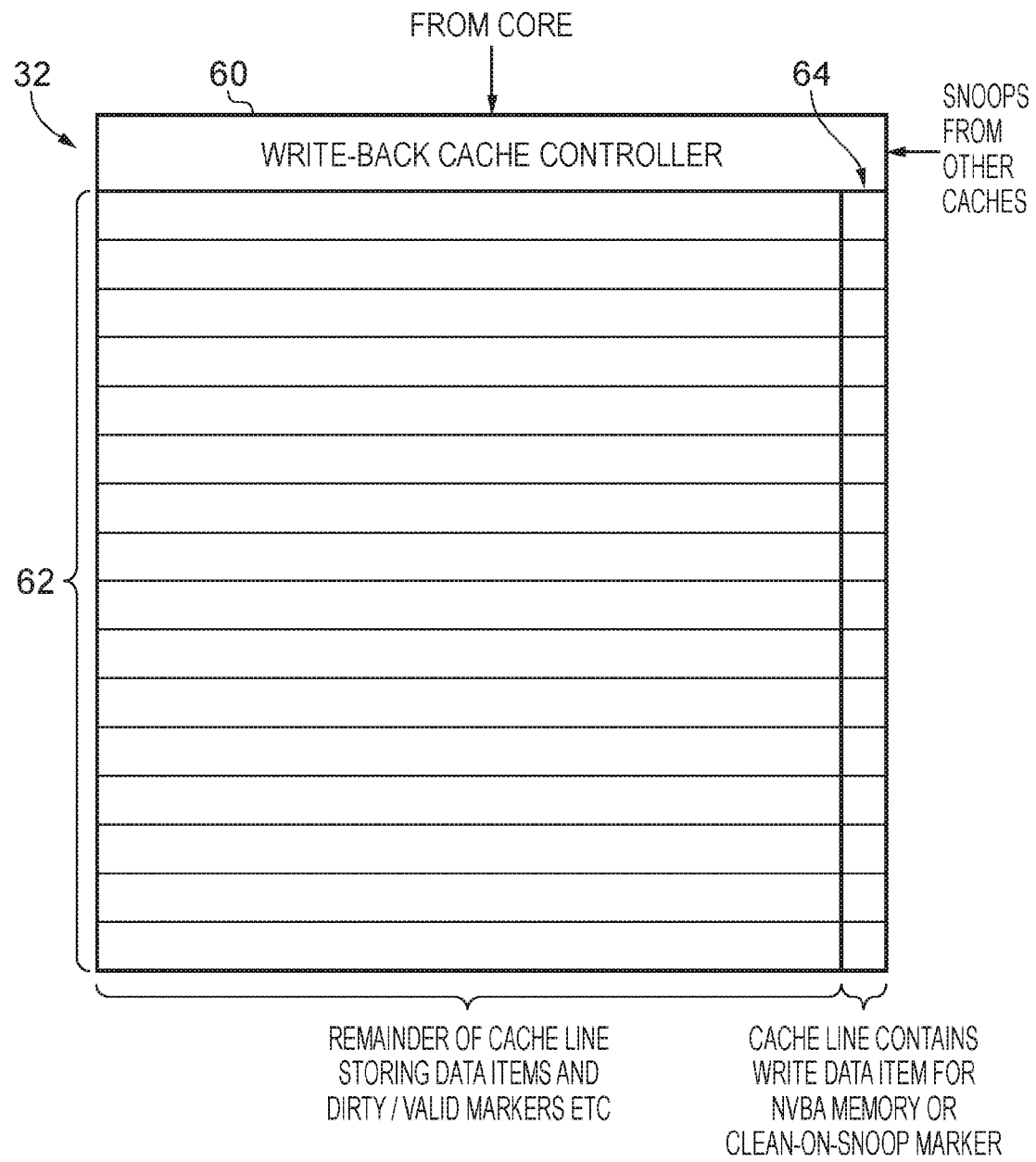
FIG. 4 schematically illustrates a level one cache in one embodiment.

FIG. 4 schematically illustrates some more detail of the L1 cache 32, showing that this write-back cache has a controller 60 and a number of cache lines 62. The cache controller 60 monitors data items and control signals received from the core 30, the control signals being received both from the pipeline 36 and from the FIFO control 48. The cache lines 62 are configured to store the data items used by the processor core in its data processing operations and each cache line stores both the data items themselves and associated status markers (dirty/valid and so on in the usual fashion). However, note that in addition one bit of each cache line is defined here as a special purpose marker 64 which indicates that the cache line contains a write data item for the NVBA memory. This can equivalently be treated as a clean-on-snoop marker, wherein if a snoop is received from another cache/CPU is received which hits in one of the cache lines 62 the presence of the marker 64 causes that cache line to be cleaned to the NVBA memory. Indeed, more generally the marker 64 can be used to indicate a line that should be cleaned when an event occurs that means that this local L1 cache 32 no longer has exclusive control over the content of that line. Eviction of the cache line is just one such example, for which the marker 64 can thus be viewed as a clean-on-evict marker. In the configuration illustrated the cache controller 60 is configured to monitor the snoops received from other caches in the memory system of the data processing apparatus 10, and when a snoop from another cache is received relating to a data item stored in a cache line 62 of the cache 32 for which the marker 64 indicates that this cache line relates to a data item in the NVBA memory, the cache controller 60 is configured to immediately cause that cache line to be evicted. This event is also signalled to the FIFO control 48 such that any corresponding content in the FIFO 46 can be cleared. The response to the snoop from the other cache can then indicate that the snooped data item is valid.

Figure 5:
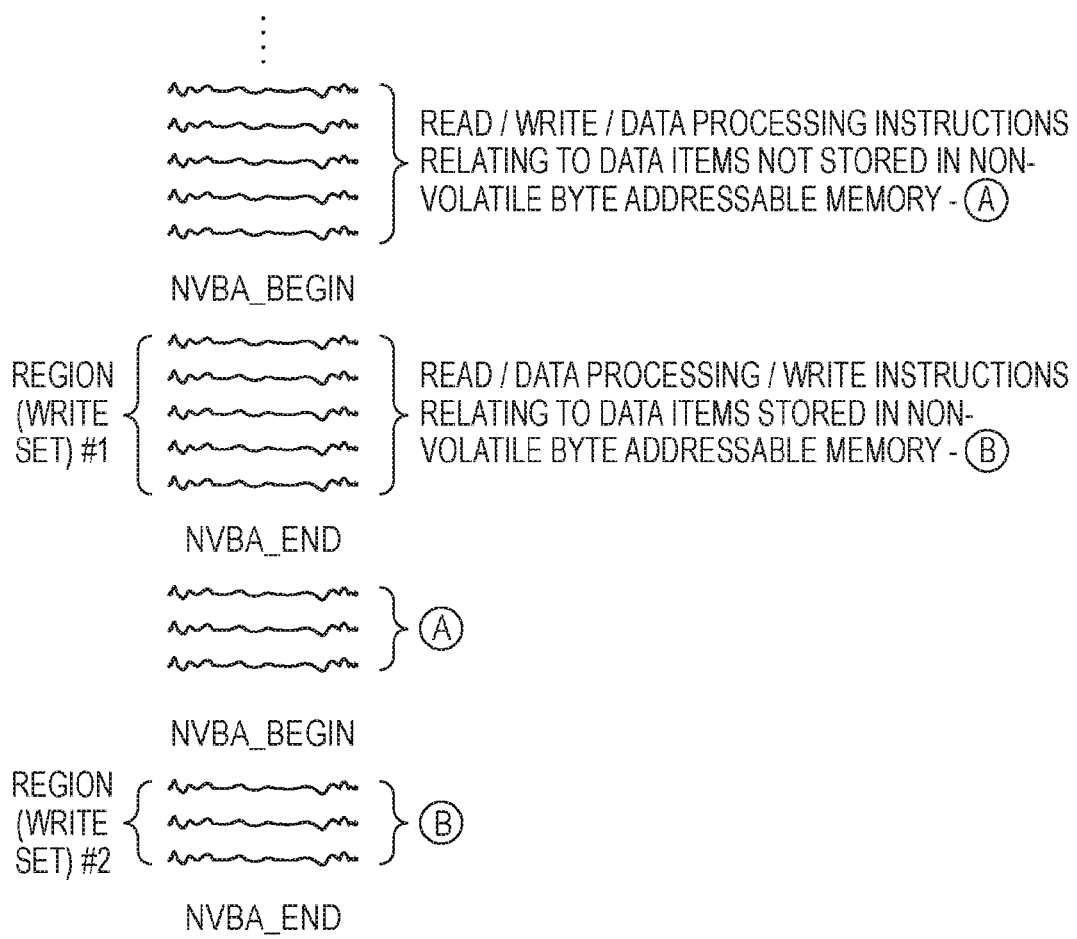
FIG. 5 shows an example sequence of instructions which a data processing apparatus of one embodiment may execute.

FIG. 5 shows an example sequence of instructions which may be executed by the processor core 30 shown in FIG. 1. The first portion of the sequence (labelled A), has a number of instructions which relate to read, write and data processing instructions which access data items which are not stored in the non-volatile byte-addressable memory. Thereafter follows a nvba_begin instruction defining the beginning of a first region (write set) in which the read, data processing and write instructions relate (at least in part) to data items which are stored in the non-volatile byte-addressable memory 18. This first region (write set) (labelled B) concludes with the nvba_end instruction. Thereafter follows a second set of instructions (A) which do not relate to data items stored in the non-volatile byte-addressable memory. Finally a second region (write set) of read, data processing and write instructions (B) relating (at least in part) to data items stored in the non-volatile write addressable memory 18 is defined by a second nvba_begin instruction and a second nvba_end instruction. The provision of the nvba_begin and nvba_end instructions enable the programmer to define write sets, the ordering of which (with respect to one another) the present techniques can preserve, even when the accessed data items are stored in non-volatile memory, access to which is cached by a write-back cache.

Figure 6:
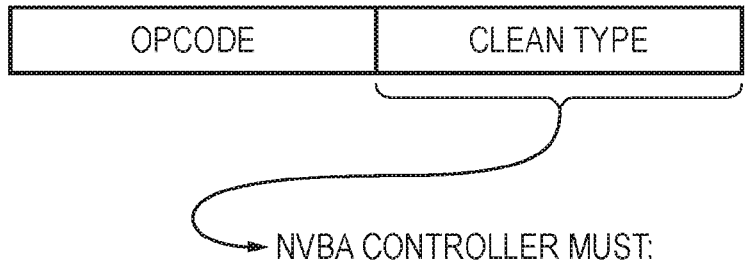
FIG. 6 shows the encoding of control information in each of two instructions in one embodiment.
Figure 6:
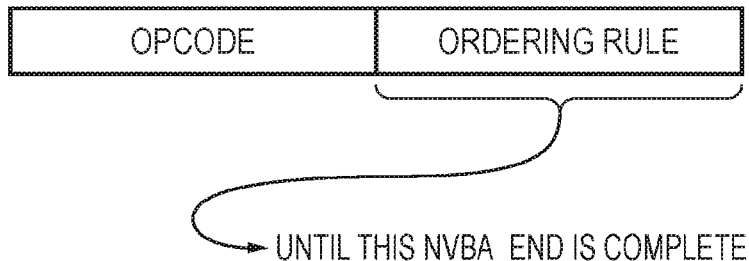

FIG. 6 shows example encodings of the nvba_begin and nvba_end instructions in one embodiment. Each instruction comprises an opcode which defines it as either the nvba_begin or nvba_end instruction respectively. In addition, encoding space in each instruction is used to provide control information of relevance to the present techniques. The nvba_begin instruction comprises control information which defines a clean type. The clean type specifies the type of response that is required from the non-volatile memory controller 24 when the L1 cache 32 cleans content out to the NVBA memory 18. Two example types of response are shown. In the first, the non-volatile memory controller may merely acknowledge that the command to clean content has been received. In the second, the non-volatile memory controller may confirm that the clean command has been carried out, i.e. that that content has been updated in the non-volatile memory and is thus ensured to be persistent. The nvba_end instruction comprises control information which defines how instructions which follow the nvba_end instruction are treated until the nvba_end instruction completes. In may be the case that no restriction on these following instructions are imposed, but various example levels of restriction are shown, indicating types of instruction which can be caused to stall until the nvba_end instruction completes. As shown, these are: all subsequent nvba_begin instructions; all subsequent writes to NVBA memory; all subsequent memory operations; or all subsequent instructions. Varying degrees of protection over the write set encapsulated by the nvba_begin and nvba_end instructions can thus be implemented.

Figure 7:
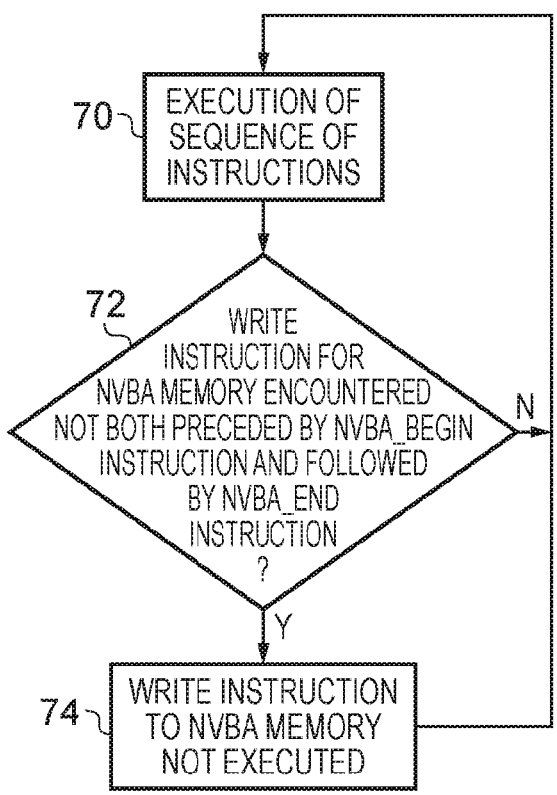
FIGS. 7 to 10 show sequences of steps which are carried out in the data processing apparatus of one embodiment.

There now follows a description of various steps which are carried out in the data processing apparatus of one embodiment, or alternatively viewed in the method of one embodiment, in order to implement the present techniques. FIGS. 7-10 show different aspects of the ongoing operation and monitoring within the data processing apparatus which support various features of the present techniques. For example, FIG. 7 schematically illustrates a sequence of steps which monitor for particular instructions related to the NVBA memory 18. The flow can be considered to begin at step 70 where the data processing apparatus is executing its sequence of instructions. At step 72 it is determined if a write instruction directed to the NVBA memory has been encountered which is not both preceded by a begin_nvba instruction and followed by an end_nvba instruction. When this is the case, the write instruction thus identified (step 74) is caused not to be executed and the flow returns to step 70. Non-execution of the write instruction could take a number of forms, e.g. merely suppressing the instruction, generating a processing fault, and so on. If such a write instruction is not identified at step 72 the flow proceeds directly back to step 70.

Figure 8:
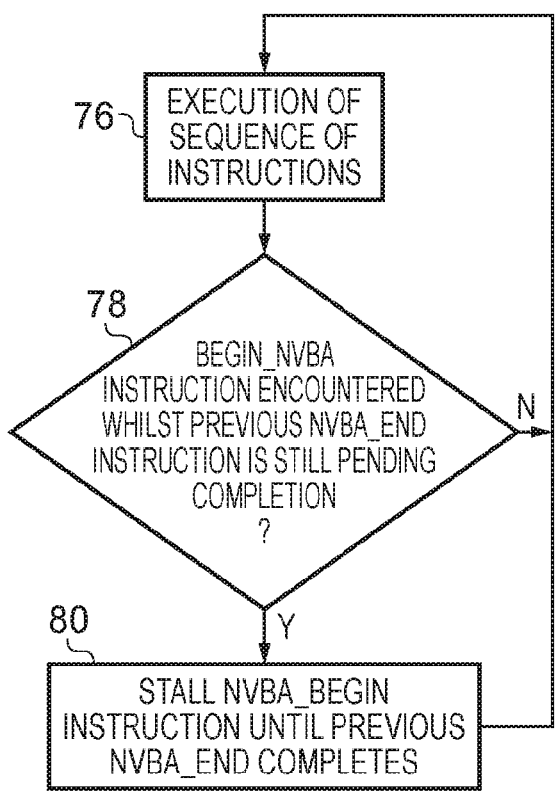

FIG. 8 schematically illustrates a sequence of steps which are implemented to support write set ordering. The flow can be considered to begin at step 76 where the data processing apparatus is executing its sequence of instructions. Thereafter, at step 78, it is determined if a nvba_begin instruction has been encountered whilst a previous nvba_end instruction is still pending completion. In other words, the beginning of a second write set in the sequence of instructions has been found, whilst a previous write set is still in the process of being handled by the data processing apparatus. In this embodiment, in order to strictly ensure the ordering of these write sets, when such a condition is satisfied at step 78 then the flow proceeds to step 80 where the new nvba_begin instruction is stalled until the previous nvba_end instruction has completed. Thereafter, the flow returns to step 76. Alternatively, if the condition at step 78 is not fulfilled then the flow also returns to step 76.

Figure 9:
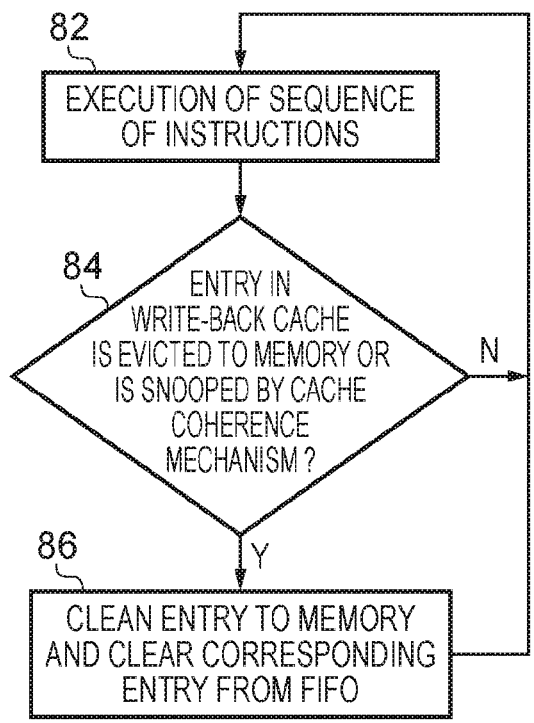

FIG. 9 schematically illustrates a sequence of steps which relate to a cache coherence mechanism in which the L1 cache 32 participates. Step 82 represents the ongoing execution of the sequence of instructions by the data processing apparatus, where the flow of these steps can be considered top begin. At step 84 it is determined if either an entry in the write-back cache 32 has been selected to be evicted to memory or is being snooped by the cache coherence mechanism. Whilst neither of these events are occurring the flow simply returns to the spec 82. However when either of them does occur then (step 86) the corresponding entry in the L1 cache 32 is cleaned to memory and the L1 cache 32 signals to the FIFO control 48 that the corresponding entry in the FIFO 46 should be cleared.

Figure 10:
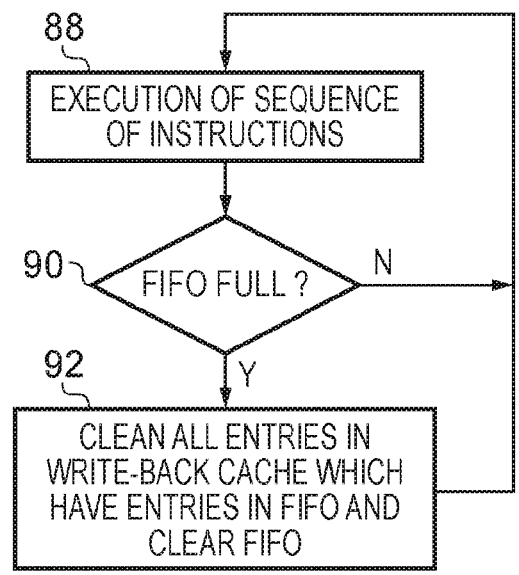

FIG. 10 relates to the administration of the FIFO 46 itself. In the course of executing the sequence of instructions (step 88) by the processor core 30, it is determined at step 90 if the FIFO storage 50 has become full. Whilst this is not the case, the flow simply returns to step 88. However, if the FIFO becomes full then the flow proceeds to step 92 where all entries in the write-back cache which have a corresponding entry in the FIFO are cleaned (to the non-volatile memory 18) and the FIFO storage 50 is cleared.

Figure 11:
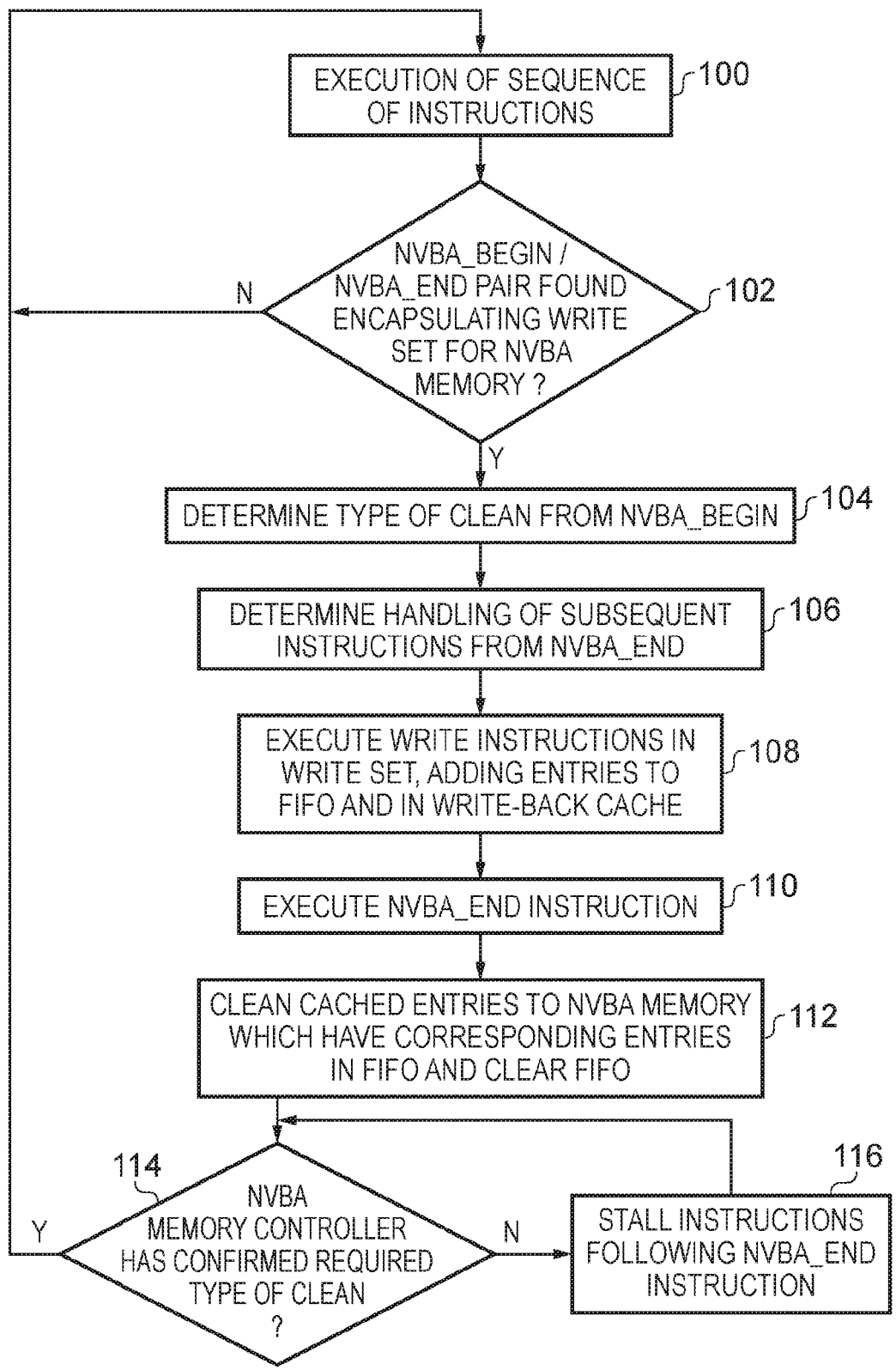
FIG. 11 schematically illustrates a sequence of steps which are taken in a data processing apparatus in one embodiment.

FIG. 11 shows a sequence of steps which are carried out in the method of one embodiment. The ongoing execution of the sequence of instructions by the data processing apparatus is represented by step 100. Thereafter it is determined if a nvba_begin/nvba_end instruction pair has been encountered in the sequence of instructions encapsulating a write set for the NVBA memory. Whilst this is not the flow returns back to step 100. Once such a write set is identified then, at step 104, the type of write-back clean which will be required for this write set is determined from the nvba_begin instruction. At step 106 the manner in which instructions which follow the nvba_end instruction should be handled are determined the nvba_end instruction. Then (step 108) the instructions which in substance form the write set can be executed, and for those instructions which are configured to cause write operations to the NVBA memory entries in the FIFO 46 are made and the modified data items are cached in the L1 cache 32. Once the nvba_end instruction itself has been executed (step 110) cleaning of data items in the L1 cache 32 which have corresponding entries in the FIFO 46 to the NVBA memory 18 is initiated and the FIFO 46 is cleared. Then at step 114 it is determined if the required type of clean (as specified in the nvba_begin) has completed, i.e. if the NVBA memory controller 24 has either acknowledged receipt of the clean command or (if required) has further confirmed completion of the clean. Whilst this is not the case, the flow loops via step 116 where instructions (of the type specified in the nvba_end instruction) which follow the nvba_end instruction are caused to stall. Once the clean is confirmed, the flow returns to step 100.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus for processing data comprising:
   a processor core configured to retrieve a sequence of instructions from memory and to perform data processing operations in response to the sequence of instructions, wherein the data processing operations comprise read operations which retrieve data items from a memory and write operations which write data items to the memory, wherein the memory is a non-volatile memory;
   a write-back cache configured to store local copies of the data items retrieved from the memory and written to the memory by the processor core when executing the sequence of instructions; and
   a storage unit configured to store indications of the write operations initiated by the processor core, and
   the processor core is configured to respond to an end instruction in the sequence of instructions by:
      causing the local copies of data items which are the subject of the write operations by the processor core and for which an indication is stored in the storage unit to be cleaned from the write-back cache to the memory; and
      clearing the indications of the write operations stored in the storage unit,
   wherein the processor core is further configured to cause the indications of the write operations initiated by the processor core to be stored in the storage unit after a begin instruction in the sequence of instructions,
   wherein the processor core is configured to only perform a write operation to a predetermined portion of the memory when a pending write instruction specifying the predetermined portion of the memory is preceded by the begin instruction and followed by the end instruction,
   wherein the processor core is configured to prevent a stray write operation to the predetermined portion of the memory from being performed, wherein the stray write operation comprises a pending write instruction specifying the predetermined portion of the memory, when the pending write instruction is not preceded by the begin instruction and followed by the end instruction, such that the predetermined portion of the memory cannot be written to other than by a write instruction which is preceded by the begin instruction and followed by the end instruction, and
   wherein the processor core is configured to allow a further stray write operation to a further portion of the memory to be performed by a further pending write instruction, wherein the further portion of the memory is distinct from the predetermined portion of memory, and wherein the further stray write operation comprises a pending write instruction specifying the further portion of the memory when the further stray write operation is not preceded by the begin instruction and followed by the end instruction.

2. The apparatus as claimed in claim 1, wherein the non-volatile memory is byte-addressable.

3. The apparatus as claimed in claim 1, wherein the processor core is configured to respond to the end instruction and a subsequent begin instruction in the sequence of instructions by causing the subsequent begin instruction in the sequence of instructions to stall until the end instruction has completed.

4. The apparatus as claimed in claim 1, wherein the processor core is configured to respond to the end instruction and a subsequent memory operation instruction in the sequence of instructions by causing the subsequent memory operation instruction in the sequence of instructions to stall until the end instruction has completed.

5. The apparatus as claimed in claim 1, wherein the processor core is configured to respond to the end instruction and a subsequent instruction in the sequence of instructions by causing the subsequent instruction in the sequence of instructions to stall until the end instruction has completed.

6. The apparatus as claimed in claim 1, wherein the storage unit is a first-in-first-out storage unit.

7. The apparatus as claimed in claim 6, wherein the processor core comprises the first-in-first-out storage unit.

8. The apparatus as claimed in claim 1, wherein the storage unit is provided by the write-back cache and the indications of the write operations initiated by the processor core are stored as markers associated with cache lines stored in the write-back cache, wherein setting of a marker of the markers indicates whether a local copy of a data item forming at least part of a cache line of the cache lines is the subject of the write operations by the processor core.

9. The apparatus as claimed in claim 1, wherein the storage unit is configured to store at least partial memory addresses of the write operations initiated by the processor core as the indications.

10. The apparatus as claimed in claim 1, wherein the indications stored in the storage unit indicate at least one cache block where data items corresponding to the write operations are stored in the write-back cache.

11. The apparatus as claimed in claim 1, wherein the processor core is further configured to reference a page table to determine virtual-to-physical memory address mappings, each entry in the page table comprises a flag to indicate whether that entry corresponds to a predetermined memory address space, and the processor core is configured to cause indications of write operations to the predetermined memory address space initiated by the processor core to be stored in the storage unit.

12. The apparatus as claimed in claim 1, wherein the processor core is configured to respond to an encoding within the begin instruction to stall any instructions which follow the end instruction until a controller in the memory acknowledges receipt of a command to commit the local copies of data items cleaned from the write-back cache to the memory.

13. The apparatus as claimed in claim 1, wherein the processor core is configured to respond to an encoding within the begin instruction to stall any instructions which follow the end instruction until a controller in the memory indicates that the local copies of data items cleaned from the write-back cache to the memory have been committed to the memory.

14. The apparatus as claimed in claim 1, further configured, in response to a clean condition, to cause at least one local copy of the local copies stored in the write-back cache which is the subject of at least one write operation by the processor core and for which an indication is stored in the storage unit to be cleaned from the write-back cache to the memory and to clear at least one corresponding indication of the at least one write operation stored in the storage unit.

15. The apparatus as claimed in claim 14, wherein the clean condition is satisfied when the storage unit is full.

16. The apparatus as claimed in claim 14, wherein the clean condition is satisfied when a local copy stored in the write-back cache is evicted to the memory.

17. The apparatus as claimed in claim 14, wherein the clean condition is satisfied when a local copy stored in the write-back cache is snooped by a cache coherence mechanism and for which an indication is stored in the storage unit.

18. The apparatus as claimed in claim 17, wherein the write-back cache is configured to store clean-on-snoop markers associated with cache lines stored in the write-back cache, wherein setting of a clean-on-snoop marker indicates that a corresponding indication is stored in the storage unit.

19. The apparatus as claimed in claim 1, wherein the storage unit is a content-addressable storage unit.

20. A method of processing data comprising the steps of:

performing data processing operations in response to a sequence of instructions, wherein the data processing operations comprise read operations which retrieve data items from a memory and write operations which write data items to the memory, wherein the memory is a non-volatile memory;

storing local copies in a write-back cache of the data items retrieved from the memory and written to the memory when executing the sequence of instructions;

storing indications of the write operations initiated in the performing data processing operation step after a begin instruction in the sequence of instructions;

responding to an end instruction in the sequence of instructions by:

causing the local copies of data items which are the subject of the write operations and for which an indication has been stored in the storing local copies step to be cleaned from the write-back cache to the memory; and clearing the indications of the write operations stored in the storing indications step, wherein a write operation to a predetermined portion of the memory can only be performed when a pending write instruction specifying the predetermined portion of the memory is preceded by the begin instruction and followed by the end instruction;

preventing a stray write operation to the predetermined portion of the memory from being performed, wherein the stray write operation comprises a pending write instruction specifying the predetermined portion of the memory when the pending write instruction specifying the predetermined portion of the memory is not preceded by the begin instruction and followed by the end instruction, such that the predetermined portion of the memory cannot be written to other than by a write instruction which is preceded by the begin instruction and followed by the end instruction;

allowing a further stray write operation to a further portion of the memory to be performed by a further pending write instruction, wherein the further portion of the memory is distinct from the predetermined portion of memory, and wherein the further stray write operation comprises a pending write instruction specifying the further portion of the memory when the further stray write operation is not preceded by the begin instruction and followed by the end instruction.

\* \* \* \* \*